US010506018B2

(12) United States Patent
Watanabe

(10) Patent No.: US 10,506,018 B2
(45) Date of Patent: Dec. 10, 2019

(54) PROCESSING APPARATUS, PROCESSING METHOD AND PROGRAM

(71) Applicant: CANON KABUSHIKI KAISHA, Tokyo (JP)

(72) Inventor: Akira Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 496 days.

(21) Appl. No.: 15/133,850

(22) Filed: Apr. 20, 2016

(65) Prior Publication Data
US 2016/0323355 A1 Nov. 3, 2016

(30) Foreign Application Priority Data
Apr. 30, 2015 (JP) .................................. 2015-093503

(51) Int. Cl.
*G06F 15/16* (2006.01)
*H04L 29/08* (2006.01)

(52) U.S. Cl.
CPC ............ *H04L 67/025* (2013.01); *H04L 67/06* (2013.01)

(58) Field of Classification Search
CPC ....................... H04N 1/00222; H04N 1/00952
See application file for complete search history.

(56) References Cited

U.S. PATENT DOCUMENTS

| 2003/0103226 A1* | 6/2003 | Nishio ................. G06F 3/1204 358/1.13 |
| 2005/0198204 A1* | 9/2005 | Takahashi ........... G06F 21/6218 709/219 |
| 2011/0164268 A1* | 7/2011 | Hirai ....................... H04N 1/00 358/1.13 |
| 2014/0063544 A1* | 3/2014 | Kadota ................ G06F 13/385 358/1.15 |

FOREIGN PATENT DOCUMENTS

JP 2009044232 A 2/2009

* cited by examiner

*Primary Examiner* — Yves Dalencourt
(74) *Attorney, Agent, or Firm* — Canon U.S.A., Inc. IP Division

(57) ABSTRACT

An apparatus includes: a communication unit which communicates with an external apparatus according to an HTTP; a receiving unit which receives, through the communication unit, an HTTP request for executing predetermined processing; an execution unit which executes the predetermined processing according to the HTTP request; a determination unit which determines whether the execution unit has started execution normally; and a transmitting unit which transmits an HTTP response including a processing result to the external apparatus according to the HTTP request. If the receiving unit has received a request, the transmitting unit transmits a part of an HTTP response before the execution unit finishes execution. If the determination unit has determined that the execution has been started normally, or that the execution cannot be started normally, the transmitting unit transmits an HTTP response including data obtained from the execution, or an HTTP response not including such data, respectively.

13 Claims, 9 Drawing Sheets

FIG. 3A

```
POST /request/url HTTP/1.1                          ← REQUEST LINE

Host: 192.168.1.100
Connection: Close                                    ← HEADER
Content-Type: text/xml
Content-Length: 436
                                                     ← BLANK LINE <?xml version="1.0" encoding="utf-8"?>
<scan: xmlns:scan="http://xxx.xxx.xxx.xxx/sample/scan/spec">
 <scan:Request>
   <scan:Info>
     <scan:UserName>TestUser</scan:UserName>
     <scan:Command>PullScanRequest</scan:Command>    ← BODY
   </scan:Info>
 </scan:Request>
 <scan:Job>
   <scan:Resolution>300</scan:Resolution>
   <scan:Width>8500</scan:Width>
   <scan:Height>21600</scan:Height>
 </scan:Job>
</scan:Request>
```

FIG. 3B

```
HTTP/1.1 200 OK                                      ← STATUS LINE

Server: WebServer
Connection: Close                                    ← HEADER
Content-Type: text/xml
Content-Length: 306
                                                     ← BLANK LINE <?xml version="1.0" encoding="utf-8"?>
<scan: xmlns:scan="http://xxx.xxx.xxx.xxx/sample/scan/spec">
 <scan:Response>
   <scan:Info>
     <scan:Command>PullScanResponse</scan:Command>
   </scan:Info>                                      ← BODY
 </scan:Request>
 <scan:Job>
   <scan:JobId>1</scan:JobId>
   <scan:ScanDataURL>http://192.168.1.100/scanjob/1</scan:ScanDataURL>
 </scan:Job>
</scan:Request>
```

PROCESSING APPARATUS, PROCESSING METHOD AND PROGRAM

BACKGROUND OF THE INVENTION

Field of the Invention

The present invention relates to a processing apparatus including a plurality of communication interfaces, a processing method, and a program.

Description of the Related Art

In recent years, there has been designed a standard for using, in universal serial bus (USB) communication, a communication protocol conventionally used in a TCP/IP network. The standard is called USB Print Interface Class IPP Protocol Specification (hereinafter referred to as IPP USB Specification). By the IPP USB Specification, a hypertext transfer protocol (HTTP) used for transmitting/receiving content including HTML can be used in USB communication. In addition, an internet printing protocol (IPP), with which print data and the like are transferred between a printer and a computer, can be used in USB communication.

Specifically, it is specified in the IPP USB Specification that an IPP command request is transferred at an endpoint for bulk-out transfer of a USB print class interface, and that an IPP command response is transferred at an endpoint for bulk-in transfer thereof. The IPP is not an only protocol specified in the standard. It is specified in the standard that a command request is received and a command response is transmitted also with the HTTP in a manner similar to that of the IPP.

With the IPP USB Specification, similar communication control can be performed for basic transmission and reception of data with the HTTP without being aware of the difference in communication interfaces such as TCP/IP network or USB. A web server or a communication apparatus which has received an HTTP request from a terminal apparatus such as a PC or a tablet executes processing according to the request, and then transmits an HTTP response as a result of the processing to the terminal apparatus. In doing so, the communication between the terminal apparatus and the web server or the communication apparatus can be controlled similarly irrespective of whether using the TCP/IP network or the USB.

In Japanese Patent Application Laid-Open No. 2009-44232, prior to transmission of scanned data, an image processing apparatus transmits, to a terminal apparatus, a response including information regarding an ability of the image processing apparatus to perform split transmission of the scanned data, then splits and transmits the scanned data to the terminal apparatus.

However, in Japanese Patent Application Laid-Open No. 2009-44232, there may be a case where reading of a document cannot be started immediately, or a case where even a first split transmission of the scanned data cannot be performed even if the reading can be started. In such cases, in TCP/IP network communication and USB communication, after transferring all data of an HTTP request, the terminal apparatus as a request source stands by for a response from the image processing apparatus as a request destination. However, in a case where the image processing apparatus cannot process the HTTP request temporarily and cannot transmit a response even after a long period of time has elapsed, some terminal apparatus may determine that the image processing apparatus is in an error condition and discards the request. In addition, some terminal apparatus may stand by permanently until it is turned off, whereby processing performed by the terminal apparatuses may be occupied.

SUMMARY OF THE INVENTION

A processing apparatus according to an embodiment of the present invention includes a communication unit, a receiving unit, an execution unit, a determination unit, and a transmitting unit. The communication unit communicates with an external apparatus in accordance with an HTTP. The receiving unit receives, through the communication unit, an HTTP request which requests execution of predetermined processing. The execution unit executes the predetermined processing according to the HTTP request received by the receiving unit. The determination unit determines whether the execution unit has started the execution normally. The transmitting unit transmits, to the external apparatus, an HTTP response including a result of the processing performed by the execution unit according to the HTTP request received by the receiving unit. In the processing apparatus, if the receiving unit receives a request for the predetermined processing through the communication unit, the transmitting unit transmits a part of an HTTP response before the execution unit finishes execution of the predetermined processing. Then, if the determination unit has determined that the execution has been started normally, the transmitting unit transmits an HTTP response including data obtained based on the execution of the processing performed by the execution unit, and if the determination unit has determined that the execution cannot be started normally, the transmitting unit transmits an HTTP response not including data obtained based on the execution of the processing performed by the execution unit.

Further features of the present invention will become apparent from the following description of exemplary embodiments (with reference to the attached drawings).

BRIEF DESCRIPTION OF THE DRAWINGS

FIGS. 3A and 3B are diagrams for explaining HTTP communication.

DESCRIPTION OF THE EMBODIMENTS

Hereinafter, embodiments of the present invention will be described with reference to the attached drawings. A relative arrangement of each constituent element of apparatuses used in the following embodiments, shape of such apparatuses, and the like, are for the purposes of illustration and there is no limitation thereto.

(First Embodiment)

Figure 1:
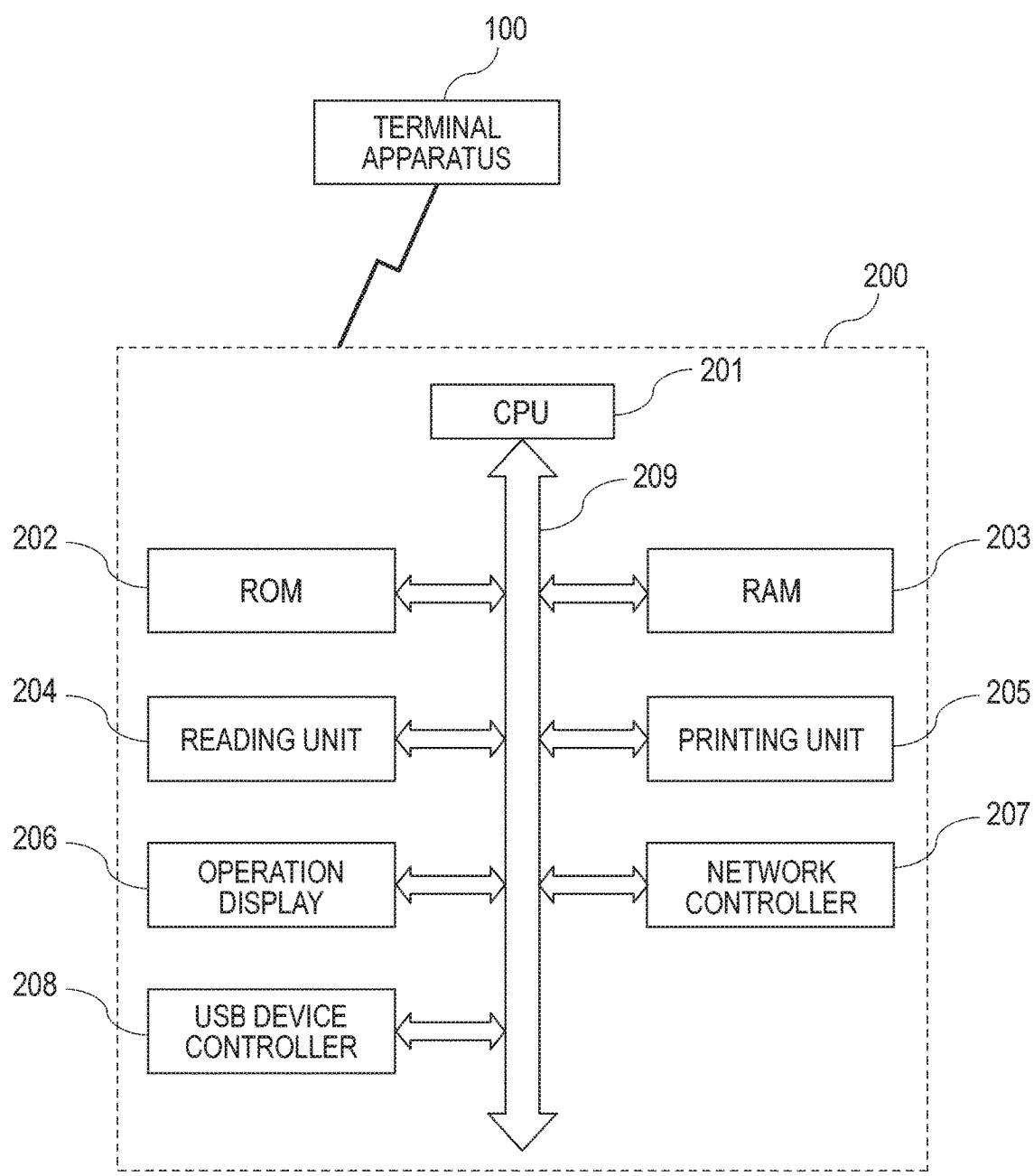
FIG. 1 is a block diagram illustrating a hardware configuration of a printer according to a first embodiment.

FIG. 1 is a diagram illustrating a communication system. As illustrated in FIG. 1, the communication system according to a first embodiment includes a terminal apparatus 100, and a printer 200 as a processing apparatus. In the embodiment, description will be given using a printer having an image reading function and a printing function as an example of the processing apparatus. However, the processing apparatus is not limited thereto. The processing apparatus may be a printer having a printing function, a printer having another function such as a facsimile function in addition to the printing function, a copying machine, or a plotter. The processing apparatus may be a scanner having an image reading function. As the processing apparatus, any processing apparatus may be used as long as it includes a plurality of communication interfaces including a USB interface, and receives a predetermined request from a terminal apparatus. The processing apparatus is not limited to an image processing apparatus.

A printer illustrated in FIG. 1 is a multifunction printer (MFP) which can be used for network communication and USB communication.

The printer 200 includes a CPU 201, a ROM 202, a RAM 203, a reading unit 204, a printing unit 205, an operation display 206, a network controller 207, and a USB device controller 208. These are connected to each other through a CPU bus 209.

The CPU 201 controls the whole apparatus (whole MFP) in accordance with a control program or the like stored in the ROM 202.

The RAM 203 is a memory region necessary for activating the CPU 201 or the like, and used as a working area when executing a program read from the ROM 202 or as a buffer upon transmitting/receiving data. The ROM 202 includes a program for operating a printer and stores a program for causing the reading unit 204 to execute scan in accordance with an HTTP.

The reading unit 204 includes a reading sensor, and reads a document made of paper, film, or the like, placed on a platen glass to generate image data. Specifically, the reading unit 204 includes a scanner head having reading sensors arranged in a line and thereby having a predetermined reading width, and generates image data (scanned data) by scanning with the scanner head.

The printing unit 205 includes a print head and ink tanks of respective colors, and prints an image on a sheet such as a print sheet by ejecting an ink in the ink tank through the print head.

The operation display 206 is an operation unit with which a user directly inputs various instructions to the printer. The user can activate various functions of the MFP and perform various settings thereof through the operation display 206. The operation display 206 includes a display of, for example, a light emitting diode (LED) or a liquid crystal display (LCD), and operation keys such as a character input key, a cursor key, a determination key, and a cancel key. In addition, at least a part of the operation display 206 may be configured as a touch panel including a display and an operation mechanism integrated with each other.

The network controller 207 is a communication unit which controls communication with a network such as a wired or wireless LAN. The network controller 207 includes a wired LAN connector and a wireless LAN module. The network controller 207 connects to other apparatuses through a wired LAN such as Ethernet (registered trademark) or a wireless LAN to make communication possible.

The USB device controller 208 is a communication unit which controls communication through a USB interface. In accordance with a USB communication standard, the USB device controller 208 connects to a USB apparatus and controls communication. The USB device controller 208 includes a USB connector. The USB device controller 208 connects to other apparatuses through a USB to make communication possible.

As described above, in the embodiment, a plurality of interfaces (wired LAN connector, wireless LAN module, and USB connector) is mounted to receive data from the terminal apparatus 100. The printer 200 can be connected to an external apparatus through these interfaces, and for example, the printer 200 can receive, from the terminal apparatus, various requests such as a scan execution request and a scanned data acquisition request. The printer 200 can execute scan by the reading unit 204 according to the scan request from the terminal apparatus 100.

In the embodiment, the printer 200 further includes a near field communication (NFC) interface (not illustrated), and can perform NFC. Furthermore, the printer 200 may include a Bluetooth (registered trademark) interface to realize Bluetooth (registered trademark) communication. In addition, the printer 200 may include a Bluetooth (registered trademark) low energy (BLE) interface to realize BLE communication.

As the terminal apparatus 100, an information processing apparatus such as a PC and a tablet is exemplified. The terminal apparatus 100 can cause the printer 200 to execute scan by requesting the printer 200 to execute various functions of the printer 200. For example, when transmitting a scan request, the terminal apparatus 100 first transmits a scan execution request, and upon receiving a response from the printer 200 to the scan execution request, transmits a scanned data acquisition request.

Figure 2:
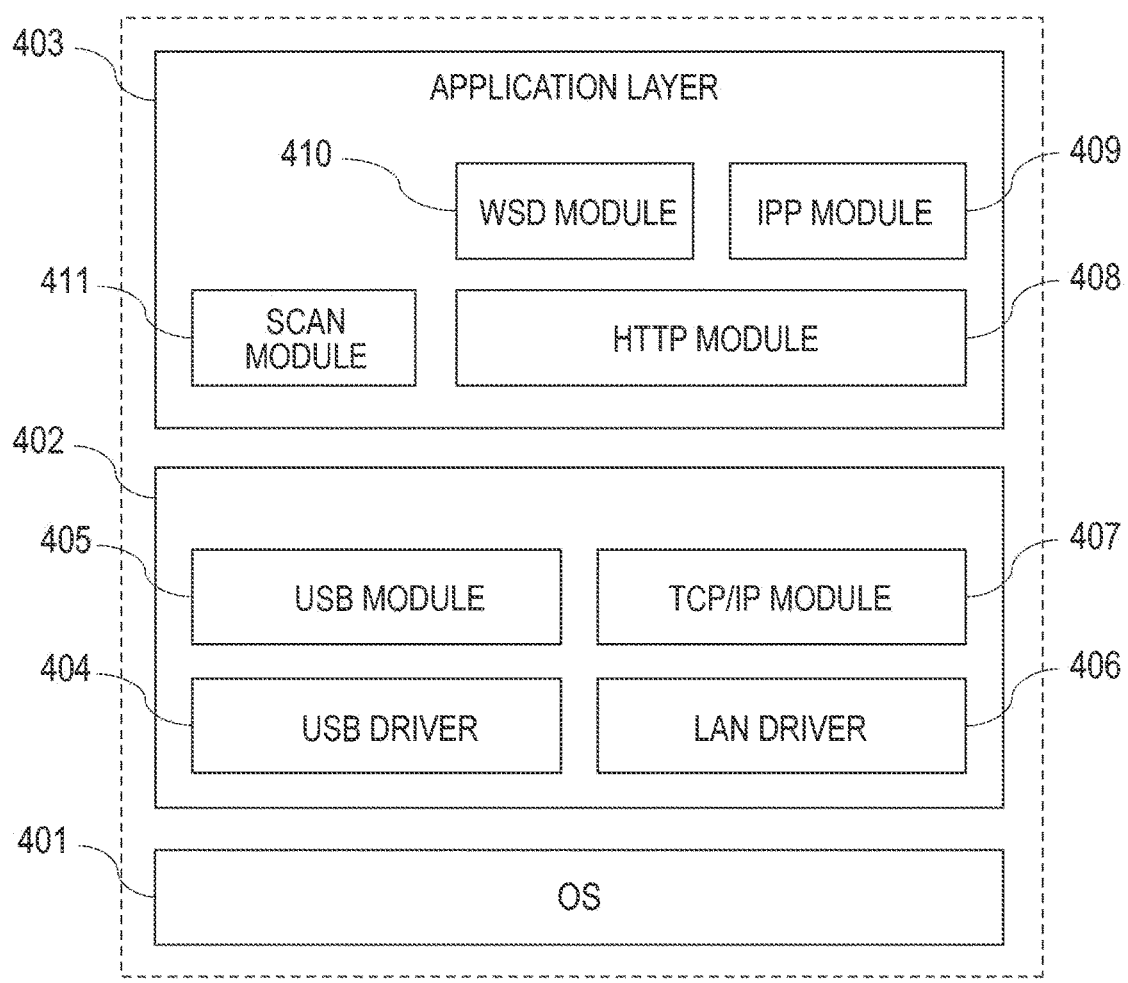
FIG. 2 is a block diagram illustrating a software configuration of the printer according to the first embodiment.

FIG. 2 is a diagram illustrating a module configuration of a program stored in the ROM 202 of the printer 200. The program is divided into an operating system (OS) 401, a middleware layer 402, and an application layer 403 of the printer 200.

The middleware layer 402 lies between the OS 401 and a group of modules of the application layer 403 and controls communication. The middleware layer 402 includes a USB driver 404, a USB module 405, a LAN driver 406, and a TCP/IP module 407. The LAN driver 406 and the TCP/IP module 407 control the network controller 207 to perform TCP/IP communication. The USB driver 404 and the USB module 405 control the USB device controller 208 to perform USB communication.

The application layer 403 includes an HTTP module 408, an IPP module 409, a WSD module 410, and a scan module 411. Network setting including an IP address of the printer 200 can be executed not only from the operation display 206, but also from the terminal apparatus 100. When the network setting is executed from the terminal apparatus 100, it is executed by activating a web browser of the terminal apparatus 100 to access the printer 200 through the network. The HTTP module 408 is used for management as a web server for setting, and for HTTP communication specified by web services for devices (WSD), IPP, or other protocol using an HTTP. The scan module 411 analyzes data received through USB communication or network communication with the HTTP module 408, the IPP module 409, or the WSD module 410. When the received data is determined to be a scan request through the analysis, the scan module 411 controls execution of scan. In addition, the scan module 411 enables the HTTP module 408 to access scanned data generated by the execution of scan. By doing so, the scan module 411 performs control in such a way that the HTTP module 408 can transmit scanned data according to a scanned data acquisition request received from the terminal apparatus 100.

Here, an outline of HTTP communication provided in the printer 200 is described using FIGS. 3A and 3B.

FIG. 3A illustrates a configuration of an HTTP request transmitted from an external apparatus. As illustrated in FIG. 3A, the HTTP request includes a request line, a header, a blank line, and a body. The request line includes a method region ("POST" in the drawing) indicating a method for processing the HTTP request, a request path region ("/request/url" in the drawing) indicating a URL where processing is performed, and a version of the HTTP ("HTTP/1.1" in the drawing). The header includes information indicating a transmission source ("Host" in the drawing) and information indicating whether a communication path is maintained ("Connection" in the drawing). The header also includes regions for describing information regarding the body, such as information indicating a data length of the body ("Content-Length" in the drawing), and information indicating a data format of the body ("Content-type" in the drawing). The blank line indicates a border between the header and the body. The body is used for specifying details of processing of the HTTP request, and there may be a case where the body is necessary, and a case where the body is not necessary, depending on the HTTP request.

FIG. 3B is a diagram illustrating a configuration of an HTTP response transmitted to the external apparatus from the printer 200. As illustrated in FIG. 3B, the HTTP response includes a status line, a header, a blank line, and a body. The status line includes a version of the HTTP ("HTTP/1.1" in the drawing) and a status code ("200 OK" in the drawing) indicating a result of acceptance of the request. The header is, as with the HTTP request, a region including information regarding the body, and the like. When there is any data to be included in a response as a result of the HTTP request acceptance processing, the body is used as a region for storing the data.

When execution of scan is instructed from the terminal apparatus 100, for example, by using an HTTP, the following procedures are used. The terminal apparatus 100 transmits, to the printer 200, an HTTP request which includes, in the body thereof, a scan execution request command which instructs execution of scan of a document (see FIG. 3A). When receiving the HTTP request for requesting scan execution, the printer 200 transmits, to the terminal apparatus 100, an HTTP response including information indicating that the scan request has been accepted (see FIG. 3B). When receiving the HTTP response from the printer 200, the terminal apparatus 100 transmits an HTTP request (GET request) for acquiring scanned data generated by the printer 200. When receiving the GET request, the printer 200 transmits, to the terminal apparatus 100, an HTTP response including data generated by the execution of scan. By the HTTP response, the terminal apparatus 100 acquires data generated by the printer 200. In the embodiment, when the printer 200 receives the HTTP request including a scan execution request command, the printer 200 transmits (responds) to the HTTP request source a header of an HTTP response before starting a scan reading operation. Then, the printer 200 transmits (responds), to the HTTP request source, a body of the HTTP response after executing the scan reading operation. By doing so, when USB communication is physically disconnected during USB communication between the printer 200 and the terminal apparatus 100, it is possible to suppress occurrence of a case where the terminal apparatus 100 determines that an application of the printer 200 is in an error condition, and to terminate the processing properly. For example, when the printer 200 makes an HTTP response after executing a scan reading operation, the printer 200 cannot make the response until a predetermined time (for example, several tens of seconds) has elapsed. In addition, for example, when the printer 200 makes an HTTP response after finishing recovery processing, the printer 200 cannot make the response until a predetermined time (for example, several minutes) has elapsed. On that occasion, there may be a case where USB communication is physically disconnected, for example, due to a USB being pulled out from the printer 200 before the terminal apparatus 100 receives the HTTP response, or due to the printer 200 and/or the terminal apparatus 100 being turned off. When USB communication is disconnected before the HTTP response to the HTTP request has been received as described above, there may be a case where the terminal apparatus 100 determines that an application of the printer 200 is in an error condition, and thereby a job cannot be cancelled. In contrast, in the embodiment, the printer makes an HTTP response including a header of an HTTP. Therefore, even if the USB communication is disconnected, the printer is not determined to be in an error condition, whereby a job can be normally cancelled.

In addition, when recovery processing of a print head is executed before the scan reading operation, an HTTP response including a header of an HTTP may be made before the execution of the recovery processing.

In the embodiment, when receiving an HTTP request including a scan execution request command through USB communication, the printer 200 transmits (responds), to the HTTP request source, a header of the HTTP response before starting a scan reading operation, as described above. On the other hand, when receiving an HTTP request including a scan execution request command through network communication, the printer 200 transmits (responds), to the HTTP request source, an HTTP response including a header and a body after executing the scan reading operation.

With reference to FIGS. 3A and 3B, the outline of HTTP communication provided in the printer 200 has been described. However, in the embodiment, any communication may be used as long as it is in accordance with an HTTP, and therefore, communication using an IPP or communication using a WSD protocol may be used.

Figure 4A:
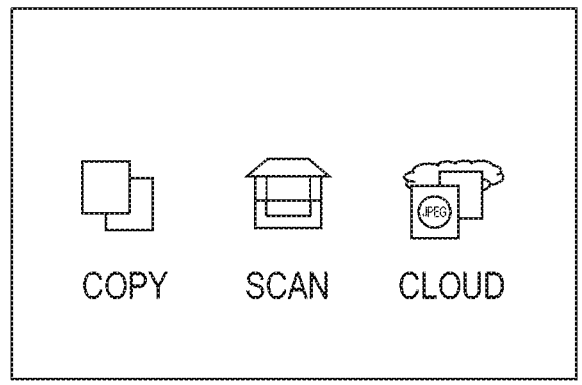
FIGS. 4A to 4C are views of a screen displayed on an operation display of the printer according to the first embodiment.
Figure 4B:
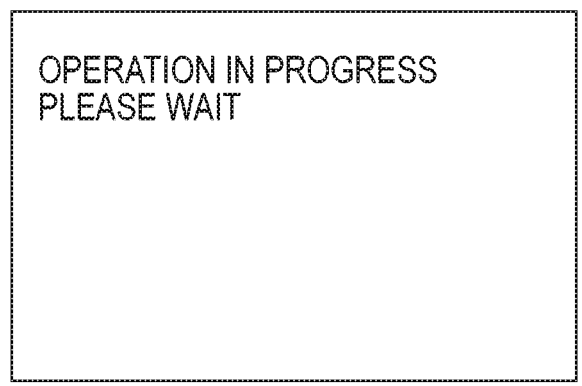
Figure 4C:
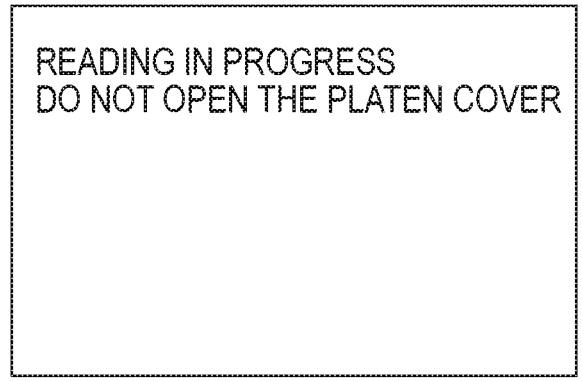

FIGS. 4A to 4C are views schematically illustrating a screen which is displayed, at the time of the scan execution, on the operation display 206 of the MFP according to the embodiment illustrated in FIG. 1. FIG. 4A illustrates a home screen indicating that the printer 200 is turned on and performs no operation including a print operation and a scan operation (idle state). With the home screen, through a key operation or a touch panel operation, it is possible to perform menu display and various settings of each of functions such as a copy function, a scan function, and a cloud function using internet communication, and to execute such functions. FIG. 4B illustrates a screen which is displayed in a case where the printer 200 cannot execute various functions. As the case where the printer 200 cannot execute various functions, there is a case where the printer 200 cannot execute reading processing immediately after receiving a scan execution request from a terminal apparatus connected through a USB or a network. As a case where reading processing cannot be executed temporarily, there is a case where specific processing is being executed. Specifically, there is a case where the printer 200 is in the middle of preparation for scan processing, for example, in the middle of correction processing of a reading sensor. In addition, there are cases where the printer 200 is in the middle of capping processing for preventing a print head from drying, recovery processing such as ink suction processing, and a case where the printer 200 is in the middle of processing by which vibration occurs in the printer 200, for example, print processing. FIG. 4C illustrates a screen which is displayed while the printer 200 is executing scan. After the printer 200 has finished the scan, the screen is returned to that illustrated in FIG. 4A.

Figure 5:
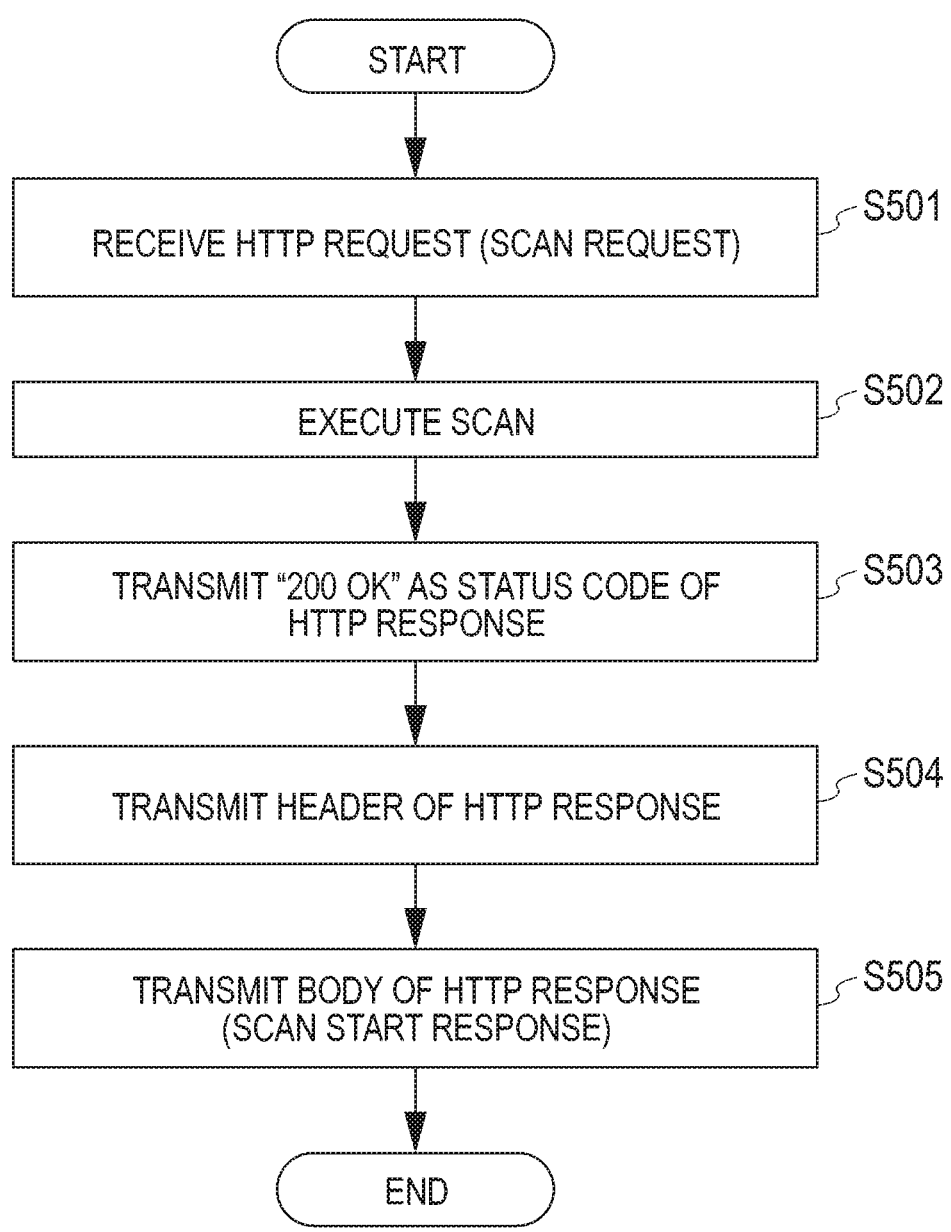
FIG. 5 is a flowchart of processing performed by the printer according to the first embodiment when receiving a scan execution request.

FIG. 5 is a flowchart illustrating a flow of processing performed by the printer 200 according to the embodiment of the present invention when receiving a scan execution request. The flow of processing illustrated in this flowchart is performed by the CPU 201 loading a control program stored in the ROM 202 into the RAM 203, and executing the program.

First, the printer 200 receives, through network communication or USB communication, a scan execution request from the terminal apparatus connected thereto (S501). In the scan execution request, information indicating a reading size of a document, resolution, and the like, is included. The printer executes scan of a sheet or a picture placed on platen glass in accordance with the content of the scan execution request (S502). After starting execution of the scan, the printer 200 transmits a status code as an HTTP response (S503), transmits a header as the HTTP response (S504), and transmits a body as the HTTP response (S505). As in a manner described above, the status code, the header, and the body are sequentially transmitted as the HTTP response.

When the printer 200 can accept the scan request, the printer 200 transmits, for example, "200 OK" as a status code of the HTTP response. The status code transmitted when the printer 200 can accept the scan request is not limited thereto, and may be "201 Created" or any other response numbered in 200s, which indicates that the request has been normally accepted. On the other hand, when the printer 200 cannot accept the scan request, the printer 200 makes a response including a status code of "500 Internal Server Error". The status code transmitted when the printer 200 cannot accept the scan request is not limited thereto.

The body only needs to include information indicating that the execution of the scan has been started, and the body may include, for example, information regarding a job ID, an address, indicated by URL or the like, of the scanned data generated by the execution of the scan.

On the operation display 206, the screen illustrated in FIG. 4A is displayed before executing scan, the screen illustrated in FIG. 4B is displayed when a scan request has been accepted, and the screen illustrated in FIG. 4C is displayed while executing scan.

Figure 6:
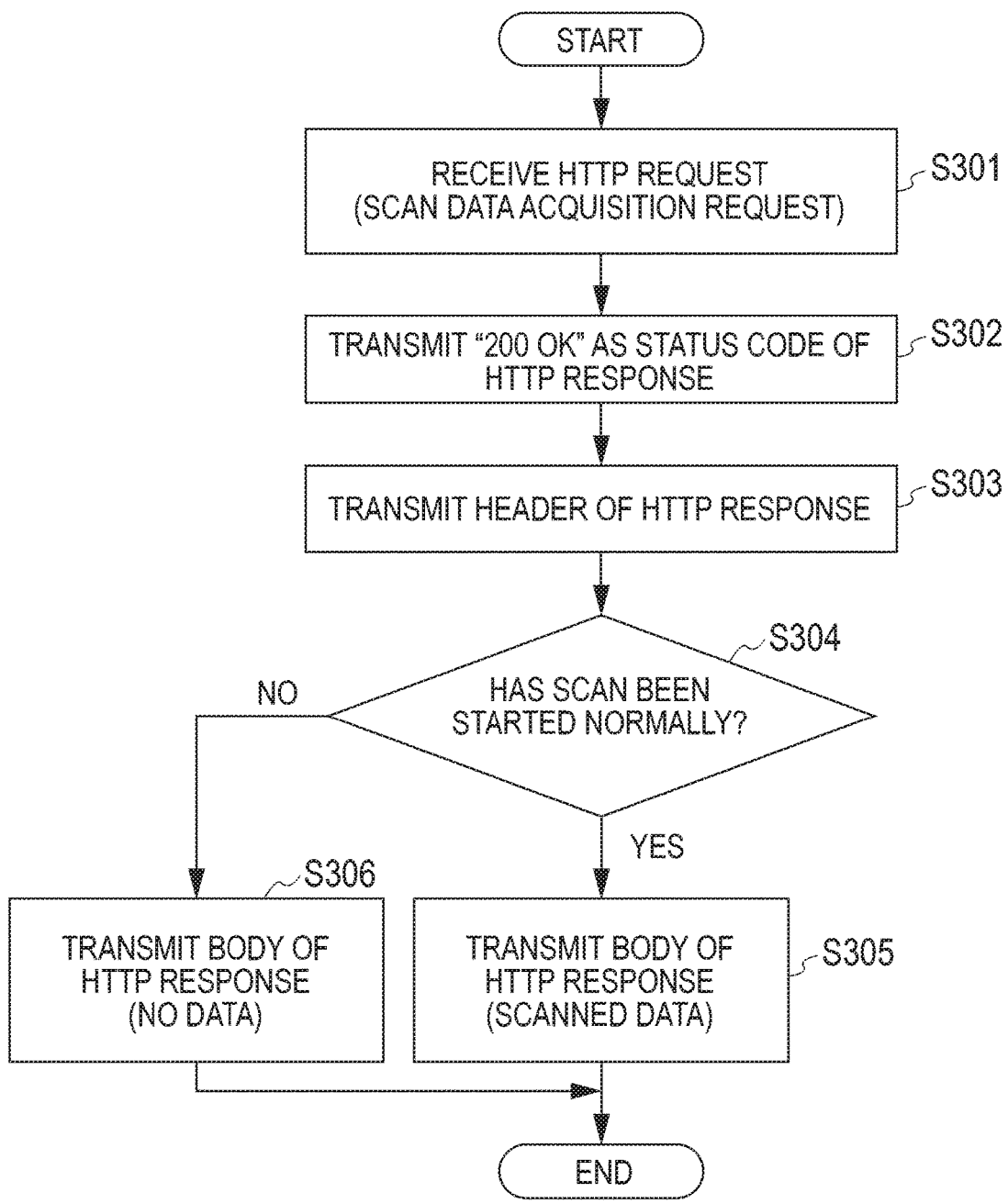
FIG. 6 is a flowchart of processing performed by the printer according to the first embodiment when receiving a scanned data acquisition request.

FIG. 6 is a flowchart illustrating a flow of processing performed by the printer 200 according to the embodiment of the present invention when receiving a scanned data acquisition request. The flow illustrated in FIG. 6 is a flow performed after the flow illustrated in FIG. 5 has been performed. Immediately before the start of this flow, the terminal apparatus 100 has received a response from the printer 200 indicating that the execution of the scan has been started. The flow of processing illustrated in this flowchart is performed by the CPU 201 loading a control program stored in the ROM 202 into the RAM 203, and executing the program.

First, the printer 200 receives a request for acquiring a result of executing processing from the terminal apparatus (S301). Here, the printer 200 receives a scanned data acquisition request from the terminal apparatus. The scanned data acquisition request includes information indicating scanned data to be acquired by the terminal apparatus, and a request line of the HTTP request includes GET which indicates that it is an acquisition request and URL of the scanned data to be acquired. The URL is information obtained from the response to the scan request described above.

Then, the printer 200 transmits "200 OK" as a status code of an HTTP response (S302), and transmits a header of the HTTP response (S303). In other words, the printer 200 transmits the status code of the HTTP response and the header of the HTTP response before determining whether the scan has been started normally. The terminal apparatus 100 displays, based on the received status code and header of the HTTP response, a message such as "receiving scanned data" and a progress bar indicating the progress of data reception.

Thereafter, the printer 200 determines whether the scan has been started normally (S304), and when the printer 200 has determined that the scan has been started normally, the printer 200 transmits scanned data as a body of the HTTP response (S305), and then terminates the processing. The terminal apparatus 100 advances the progress indicated by the progress bar based on the received body of the HTTP response. When the printer 200 has determined that the scan has not been started normally, the printer 200 transmits a body of the HTTP response which does not include scanned data (S306), and terminates the processing. On that occasion, based on the received body of the HTTP response, the terminal apparatus 100 does not advance the progress indicated by the progress bar and terminates the display of the message such as "receiving scanned data" and the progress bar. When the printer 200 has determined that the scan has not been started normally, the body of the HTTP response may include information indicating that there is no scanned data.

When scan is executed in a printer, an operation of preparation processing for scan, for example, correction processing of a reading sensor, or recovery processing such as ink suction processing, which is necessary to a print head, is performed immediately after the power is turned on or immediately after printing, and therefore, there is a period during which scan cannot be executed. In a case where the printer 200 does not respond to the terminal apparatus at all while standing by for the start of scan, the terminal apparatus 100 may determine that the printer is in an error condition since the printer does not respond although the terminal apparatus has transmitted a scanned data acquisition request. In that situation, when it is a case of USB communication, the terminal apparatus 100 may discard the scan request or the scanned data acquisition request without transmitting the requests to the printer. Furthermore, processing by the terminal apparatus 100 may be kept occupied (the terminal apparatus 100 keeps on standing by) until the terminal apparatus receives a response. Therefore, in the embodiment, before determining whether scan can be normally started, an HTTP response including up to a header is transmitted. By doing so, the terminal apparatus can recognize that the printer has accepted the scanned data acquisition request, and it is possible to suppress discarding of the scanned data acquisition request, or occupation of the processing by the terminal apparatus, which is caused by standing by for a response to the scanned data acquisition request. In addition, even when the scan has not been started normally, information indicating that there is no scanned data is transmitted as a body of the HTTP response, whereby the terminal apparatus 100 can determine that the scan is canceled due to a factor occurring in the printer 200. Therefore, the terminal apparatus does not determine that an error occurs in an application even when it takes time to start the scan or when the scan cannot be started normally. In addition, when the communication is disconnected, the terminal apparatus can terminate the processing normally as in a case of a job error, without terminating the processing as a result of determining that an error has occurred in an application.

(Second Embodiment)

In the first embodiment, when receiving the scanned data acquisition request through either of the USB communication or the network communication, the printer transmits the status code of the HTTP response and the header of the HTTP response before executing the scan. In the second embodiment, in contrast thereto, control of transmission of an HTTP response upon receiving a scanned data acquisition request is switched in accordance with the communication interfaces. The same components as those of the first embodiment are denoted by the same reference numerals. Specifically, a hardware configuration of a printer, a software configuration of the printer, a screen displayed on an operation display, and a flow of processing performed by the printer when receiving a scan request are the same as those of the first embodiment, and therefore, description thereof will be omitted.

Figure 7:
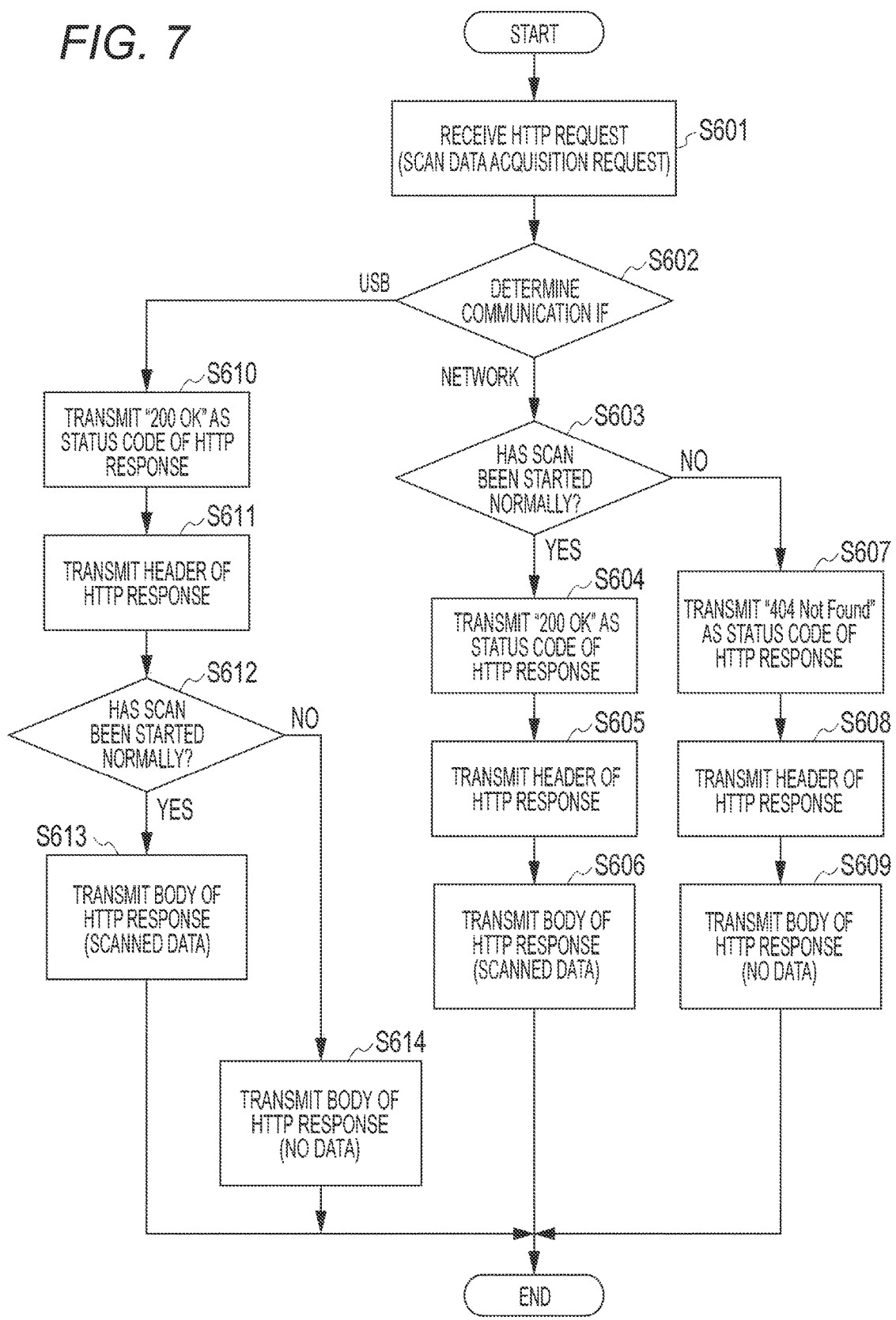
FIG. 7 is a flowchart of processing performed by a printer according to a second embodiment when receiving a scanned data acquisition request.

FIG. 7 is a flowchart illustrating a flow of processing performed by a printer 200 according to the embodiment of the present invention when receiving a scanned data acquisition request. The flow illustrated in FIG. 7 is a flow performed after the flow illustrated in FIG. 6 has been performed. Immediately before the start of this flow, the terminal apparatus has received a response from the printer indicating that the execution of the scan has been started. The flow of processing illustrated in this flowchart is performed by a CPU 201 loading a control program stored in a ROM 202 into a RAM 203, and executing the program.

First, the printer 200 receives a scanned data acquisition request from the terminal apparatus (S601). The scanned data acquisition request includes information indicating scanned data to be acquired by the terminal apparatus, and a request line of the HTTP request includes GET which indicates that it is an acquisition request and URL of the scanned data to be acquired. The URL is information obtained from the response to the scan request described above.

Next, the printer determines whether the scanned data acquisition request has been received through USB communication (S602).

When the printer 200 has determined in S602 that the scanned data acquisition request has been received not through the USB communication, that is, received through network communication, the printer 200 determines whether scan has been started normally (S603).

When the printer has determined that the scan has been started normally, the printer transmits "200 OK" as a status code of an HTTP response (S604), subsequently transmits a header of the HTTP response (S605), and transmits scanned data as a body of the HTTP response (S606). The terminal apparatus 100 displays, based on the received status code and header of the HTTP response, a message such as "receiving scanned data" and a progress bar indicating the progress of data reception. The progress indicated by the progress bar advances in accordance with the progress of reception of the scanned data.

In a case where the printer has determined in S603 that the scan has not been started normally, the printer transmits "404 Not Found" as a status code of an HTTP response (S607) since there is no scanned data, and transmits a header of the HTTP response (S608). In that case, based on the received status code and header of the HTTP response, the terminal apparatus 100 notifies a user that the scan cannot be started. In the embodiment, a message such as "unable to start scan" is displayed on the display. Notification to the user is not limited thereto, and the terminal apparatus 100 may notify the user through voice, print, or the like. Since the scan has not been started normally, the printer transmits information indicating that there is no data as a body of the HTTP response (S609).

When the printer has determined in S602 that the scanned data acquisition request has been received through the USB communication, before determining whether the scan has been started normally, the printer transmits "200 OK" as a status code of an HTTP response (S610), and transmits a header of the HTTP response (S611). The terminal apparatus 100 displays, based on the received status code and header of the HTTP response, a message such as "receiving scanned data" and a progress bar indicating the progress of data reception.

Thereafter, the printer determines whether scan has been started normally (S612), and when the printer has determined that the scan has been started normally, the printer 200 transmits scanned data as a body of the HTTP response (S613). The terminal apparatus 100 advances the progress indicated by the progress bar, based on the received body of the HTTP response. In a case where the printer has determined that the scan has not been started normally, the printer transmits, as a body of the HTTP response, information indicating that there is no data (S614). In that case, based on the received body of the HTTP response, the terminal apparatus 100 does not advance the progress indicated by the progress bar, and the terminal apparatus 100 terminates display of the message such as "receiving scanned data" and the progress bar. In the embodiment, as with the first embodiment, the printer transmits an HTTP response including up to a header before determining whether scanned data can be normally transmitted. By doing so, the terminal apparatus can recognize that the printer has accepted the scanned data acquisition request, and it is possible to suppress discarding of the scanned data acquisition request, or occupation of the processing performed by the terminal apparatus, which is caused by standing by for a response to the scanned data acquisition request. In addition, even when the scan has not been started normally, information indicating that there is no scanned data is transmitted as a body of the HTTP response, whereby the terminal apparatus can determine that the scan is canceled due to a factor occurring in the printer. Therefore, the terminal apparatus can terminate the processing while keeping a normal condition, even when it takes time to start the scan or when the scan cannot be started normally.

On the other hand, in the network communication, even when there is no response from the printer in an HTTP layer, the terminal apparatus can notify the printer that the request has been discarded by transmitting a FIN packet of a TCP/IP layer. Accordingly, it is possible to avoid occupation of a communication path and processing between the terminal apparatus and the printer.

As described above, in the embodiment, control of transmission of the HTTP response upon receiving the scanned data acquisition request is switched according to the communication interfaces. Specifically, in the network communication, an HTTP response is transmitted after determining that the scan has been executed normally. By doing so, for example, in a case of the network communication, when an error such as recovery operation and capping operation occurs in the printer, the printer can properly transmits information indicating the occurrence of the error to the terminal apparatus.

(Third Embodiment)

In the second embodiment, control of transmission of the HTTP response upon receiving the scanned data acquisition request is switched according to the communication interfaces. On the contrary, in the third embodiment, a printer is caused to execute scan not at timing when receiving a scan execution request but at timing when receiving a scanned data acquisition request. Description overlapping that in the first embodiment will be omitted. The same components as those of the first embodiment are denoted by the same reference numerals. Specifically, a hardware configuration of a printer, a software configuration of the printer, and a screen displayed on an operation display are the same as those of the first embodiment, and therefore, description thereof will be omitted.

Figure 8:
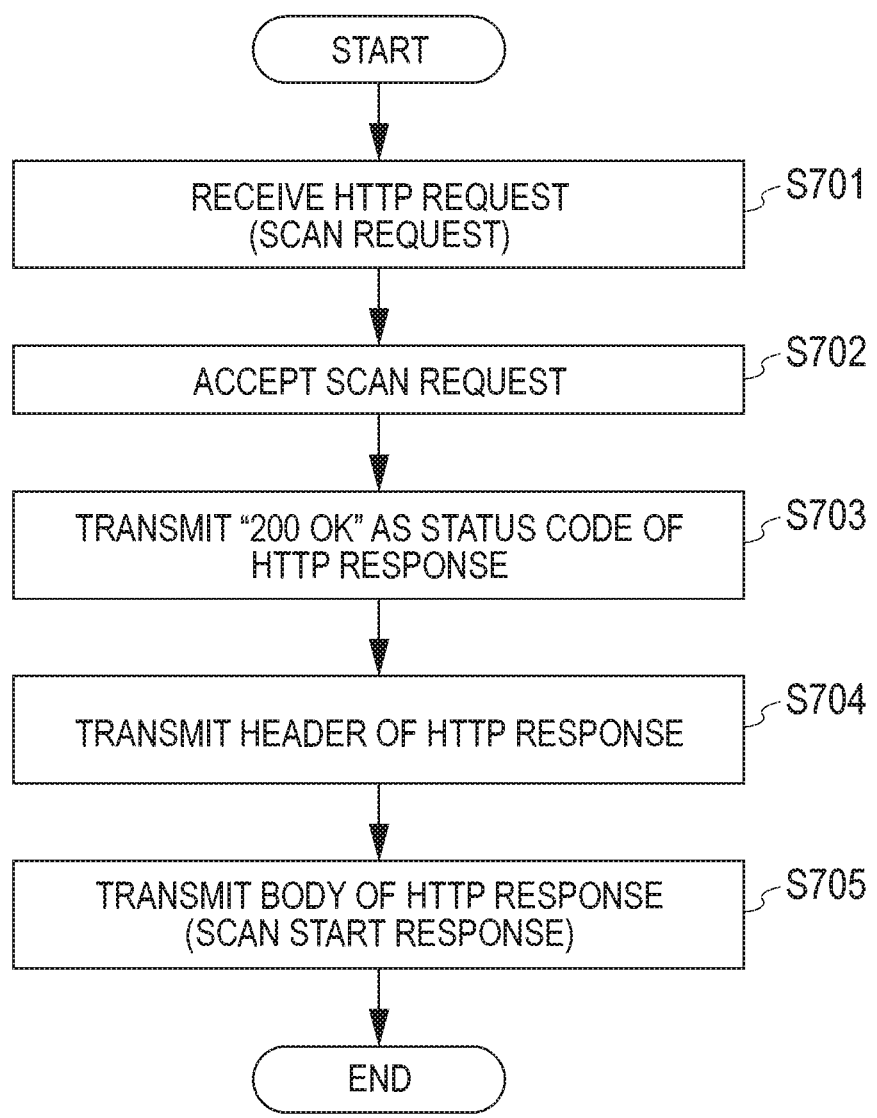
FIG. 8 is a flowchart of processing performed by a printer according to a third embodiment when receiving a scan execution request.

FIG. 8 is a flowchart illustrating a flow of processing performed by a printer 200 according to the embodiment when receiving a scan execution request. The flow of processing illustrated in this flowchart is performed by a CPU 201 loading a control program stored in a ROM 202 into a RAM 203, and executing the program.

First, the printer 200 receives a scan execution request through network communication or USB communication from a terminal apparatus connected thereto (S701). The scan execution request includes information indicating a reading size, resolution, and the like.

The printer accepts the scan execution request (S702). However, execution of the scan is not started at the time. Next, the printer transmits a status code which is an HTTP response (S703), transmits a header of the HTTP response (S704), and transmits a body of the HTTP response (S705). In the manner as described above, the status code, the header, and the body are transmitted sequentially as the HTTP response. Similarly to the first embodiment, the status code of the HTTP response may be any response numbered in 200s, which indicates that the request has been normally accepted. The body of the HTTP response includes, not the information indicating that the execution of the scan has been started, but job information indicating the acceptance of the scan, and also includes, in advance, an address such as URL of scanned data to be generated by the execution of the scan performed later.

Figure 9:
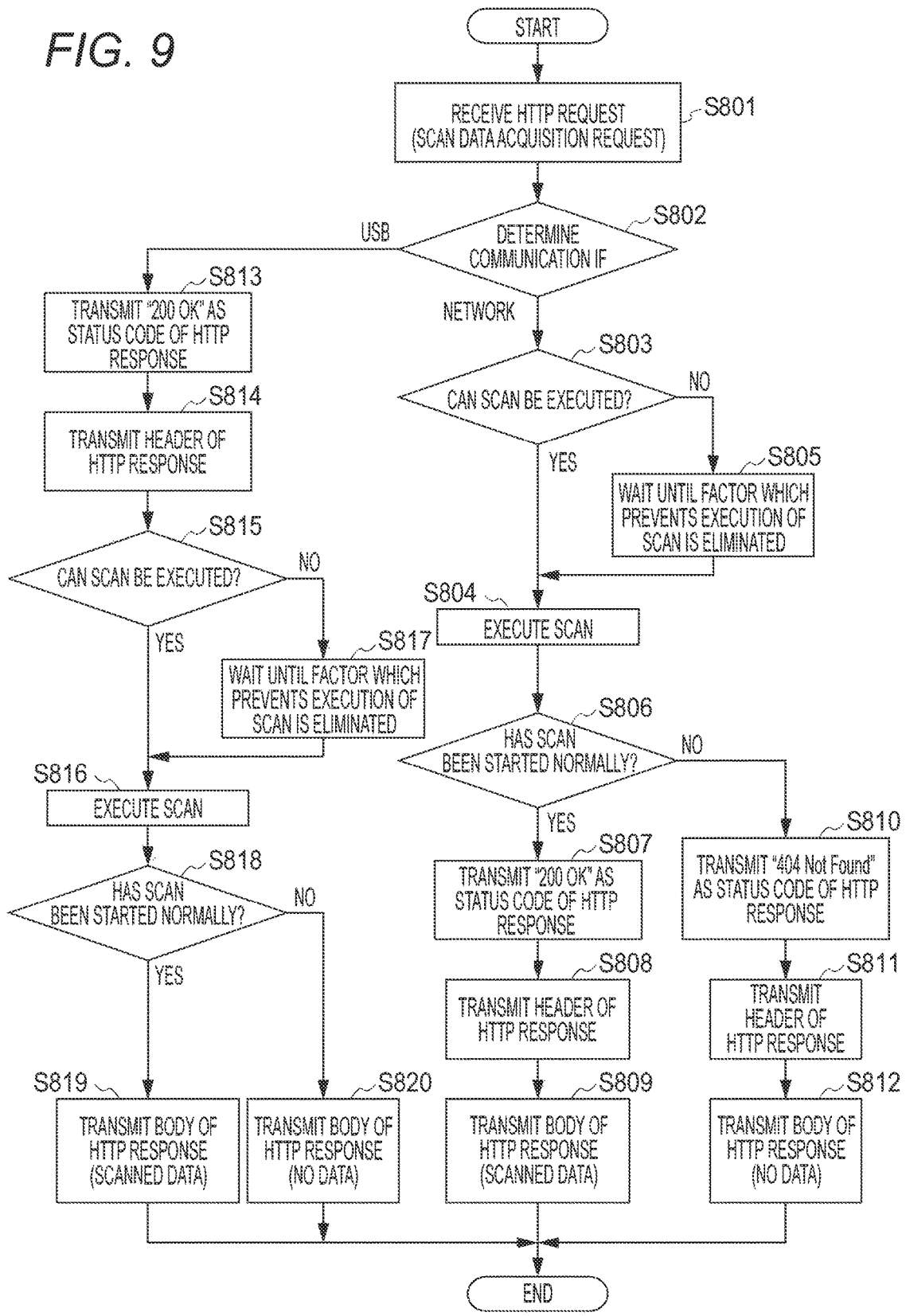
FIG. 9 is a flowchart of processing performed by the printer according to the third embodiment when receiving a scanned data acquisition request.

FIG. 9 is a flowchart illustrating a flow of processing performed by the printer according to the embodiment of the present invention when receiving a scanned data acquisition request. The flow illustrated in FIG. 9 is a flow performed after the flow illustrated in FIG. 8 has been performed. Immediately before the start of this flow, the terminal apparatus has received a response from the printer indicating that the scan request has been accepted. The flow of processing illustrated in this flowchart is performed by a CPU 201 loading a control program stored in a ROM 202 into a RAM 203, and executing the program.

First, the printer receives a scanned data acquisition request (HTTP request) from the terminal apparatus (S801). Next, the printer determines whether the scanned data acquisition request has been received through USB communication (S802). When the printer has determined that the scanned data acquisition request has been received not through the USB communication, that is, received through network communication, the printer determines whether scan can be executed immediately (S803). When the printer has determined that the scan can be executed immediately, the printer executes the scan (S804). On the other hand, when the printer has determined that the scan cannot be executed immediately, the printer waits to execute the scan until a factor which prevents the execution of the scan is eliminated (S805), and executes the scan after determining that the factor which prevents the execution of the scan has been eliminated (S804).

Next, the printer determines whether the scan has been started normally as a result of executing the scan in S804 (S806). When the printer has determined in S806 that the scan has been started normally, the printer transmits "200 OK" as a status code of an HTTP response (S807), and transmits a header of the HTTP response (S808). Then the printer transmits scanned data as a body of the HTTP response (S809). When the printer has determined in S806 that the scan has not been started normally, the printer transmits "404 Not Found" as the status code (S810), and transmits a header of the HTTP response (S811). Then, the printer transmits information indicating that there is no data as a body of the HTTP response (S812).

When the printer has determined in S802 that the scanned data acquisition request has been received through the USB communication, the printer transmits, before executing the scan, "200 OK" as a status code of an HTTP response (S813), and transmits a header of the HTTP response (S814). Thereafter, the printer determines whether the scan can be executed immediately (S815). When determining that the scan can be executed immediately, the printer executes the scan (S816). When the scan cannot be executed temporarily, the printer waits to execute the scan until a factor which prevents the execution of the scan is eliminated (S817), and executes the scan after determining that the factor which prevents the execution of the scan has been eliminated (S816).

Next, the printer determines whether the scan has been started normally as a result of executing the scan in S816 (S818). When the printer has determined that the scan has been started normally, the printer transmits scanned data as a body of the HTTP response (S819). When the printer has determined that the scan has not been started normally, the printer transmits information indicating that there is no data as a body of the HTTP response (S820). In the embodiment, at a time point when the scan execution request has been received, the scan is only accepted and not executed actually. However, in the printer, the execution of the scan is reserved, and a request for printing or scanning from another terminal apparatus is not accepted after a time point when the scan execution request has been accepted. By bringing the printer into such a state, it is possible to guarantee that the scanned data is transmitted when the printer has received the scanned data acquisition request.

Furthermore, in the embodiment, it is possible to suppress interruption of scan with a scanner head when transmission of the scanned data acquisition request from the terminal apparatus delays, by delaying timing of execution of scan. As an example of a printer in which scan with a scanner head is interrupted when transmission of the scanned data acquisition request from the terminal apparatus delays, there is a printer in which a size of a RAM 203 is small and therefore whole scanned data generated in execution of one scan cannot be stored. Such printer performs processing for storing, in the RAM 203, fragments of scanned data successively generated by executing the scan, and at the same time, sequentially transmits the stored fragments of scanned data from the RAM 203 to the terminal apparatus upon receiving the scanned data acquisition request from the terminal apparatus. However, when the scanned data acquisition request from the terminal apparatus delays, the printer temporarily runs out of free space on the RAM 203, and accordingly, there may be a case where reading with the scanner head is interrupted. After the reading has been interrupted, the free space is gradually created on the RAM 203 as the printer receives the scanned data acquisition request, and the reading can be resumed. However, when using the scanned data generated by performing reading, which has been temporarily interrupted, quality of an image obtained therefrom is deteriorated, for example, there occurs misalignment in an image based on the scanned data, in comparison to a case of using scanned data generated by performing reading at a constant rate. On the contrary, in the embodiment, as described above, it is possible to suppress the interruption of scan with a scanner head.

As described above, in the embodiment, control of transmission of the HTTP response upon receiving the scanned data acquisition request is switched according to the communication interfaces. Specifically, as described above, when the printer receives the scanned data acquisition request through USB communication, the printer transmits an HTTP response including up to a header before executing scan. By doing so, it is possible to suppress occurrence of a case where the terminal apparatus terminates as a result of determining that an error has occurred in an application between the terminal apparatus and the printer. According to the embodiment, it is possible to suppress occurrence of a case where the printer, which has received a request from the terminal apparatus, causes the terminal apparatus to stand by with no response. By doing so, a load of the terminal apparatus can be reduced, for example, when the printer cannot perform processing of a predetermined request temporarily or fails to perform processing, and it is possible to suppress occurrence of a case where the terminal apparatus does not terminate normally as a result of determining that the printer is in an error condition.

The present invention is not limited to the embodiments described above. For example, in the above embodiments, a header is transmitted as a part of an HTTP response before execution of scan is started. However, there is no limitation thereto, as long as the header of the HTTP response is transmitted irrespective of whether the execution of scan has been started. In other words, a header of an HTTP response may be transmitted after normally starting processing such as scan, as long as the header of the HTTP response is transmitted before finishing the execution of scan.

In addition, for example, the printer may preferably transmit a header of an HTTP response before starting execution of scan, also in a case where the execution of scan is instructed through Bluetooth (registered trademark) communication using an HTTP.

Furthermore, in the embodiments described above, the description has been made using a scan execution request as an example of a processing execution request. However, there is no limitation thereto. For example, as another processing execution request received from a terminal apparatus, there is an execution request for print processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-093503, filed Apr. 30, 2015, which is hereby incorporated by reference herein in its entirety.

What is claimed is:
1. A processing apparatus comprising:
at least one processor causing the processing apparatus to act as:
a receiving unit configured to receive an HTTP request for obtaining image data from an external apparatus through a USB communication;
an execution unit configured to execute predetermined processing so as to acquire the image data, based on the received HTTP request;
a transmitting unit configured to transmit, to the external apparatus, an HTTP response for responding to the received HTTP request, through the USB communication; and
a determination unit configured to determine whether the image data has been acquired,
wherein, in a case where the receiving unit receives the HTTP request from the external apparatus through the USB communication:
without relying on a determination by the determination unit, the transmitting unit transmits to the external apparatus through the USB communication, a first HTTP response in response to the received HTTP request, the first HTTP response not including an HTTP response body portion itself,
if the determination unit determines that the image data has not been acquired, the transmitting unit transmits to the external apparatus through the USB communication, a second HTTP response for responding to the received HTTP request, the second HTTP response including an HTTP response body portion in which the image data is not included, and if the determination unit determines that the image data has been acquired, the transmitting unit transmits to the external apparatus through the USB communication, a third HTTP response for responding to the received HTTP request, the third HTTP response including an HTTP response body portion in which the image data is included.

2. The processing apparatus according to claim 1, wherein the transmitting unit transmits, to the external apparatus through the USB communication, the first HTTP response, before the execution unit starts executing the predetermined processing.

3. The processing apparatus according to claim 2, wherein the receiving unit is able to receive an HTTP request from the external apparatus through a network communication, and
in a case where the receiving unit receives an HTTP request for obtaining image data, from the external apparatus through the network communication, the transmitting unit does not transmit any HTTP responses, before the execution unit acquires the image data by executing the predetermined processing.

4. The processing apparatus according to claim 3, wherein the receiving unit receives, from the external apparatus through the network communication, a first HTTP request for the predetermined processing before receiving the HTTP request for obtaining image data, as a second HTTP request, and
the transmitting unit transmits, to the external apparatus through the network communication, an HTTP response for responding to the first HTTP request for the predetermined processing, and transmits, to the external apparatus through the network communication, the first HTTP response that does not include an HTTP body portion itself in response to the second HTTP request for obtaining image data, before the execution unit acquires the image data by executing the predetermined processing.

5. The processing apparatus according to claim 1, wherein, in a case where the image data is not acquired, the transmitting unit transmits an HTTP response that includes an HTTP response body portion in which the data is not included.

6. The processing apparatus according to claim 1, further comprising a reading device configured to read a document, wherein
the executing unit executes scan processing as the predetermined processing using the reading device, and
the transmitting unit transmits, to the external apparatus through the USB communication, an HTTP response that includes an HTTP response body portion in which scanned data generated by the scan processing is included, after the execution unit executes the scan processing.

7. The processing apparatus according to claim 1, wherein communication between the processing apparatus and the external apparatus is performed using a Web Service for Devices (WSD) protocol.

8. The processing apparatus according to claim 1, wherein the communication between the processing apparatus and the external apparatus is performed using an Internet Printing Protocol (IPP).

9. The processing apparatus according to claim 1, wherein the HTTP request for obtaining image data includes a URL of the data.

10. The processing apparatus according to claim 1, wherein the first HTTP response is an HTTP response that includes a header portion.

11. The processing apparatus according to claim 3, wherein the network communication is performed using TCP/IP.

12. A processing method comprising steps of:
receiving an HTTP request for obtaining image data, from an external apparatus, through a USB communication;
transmitting, to the external apparatus, an HTTP response for responding to the received HTTP request through the USB communication;
executing predetermined processing so as to acquire the image data, based on the received HTTP request; and
determining whether the image data has been acquired,
wherein, in a case where the receiving receives the HTTP request from the external apparatus through the USB communication:
without relying on a determination by the determining step, transmitting to the external apparatus through the USB communication, a first HTTP response in response to the received HTTP request, the first HTTP response not including an HTTP response body portion itself,
if the determining step determines that the image data has not been acquired, transmitting, to the external apparatus through the USB communication, a second HTTP response for responding to the received HTTP request, the second HTTP response including an HTTP body portion in which the image data is not included, and
if the determining step determines that the image data has been acquired, transmitting to the external apparatus through the USB communication, a third HTTP response for responding to the received HTTP request, the third HTTP response including an HTTP response body portion in which the image data is included.

13. A processing apparatus comprising:
a reading device configured to read a document,
at least one processor causing the processing apparatus to act as:
a receiving unit configured to receive an HTTP request for obtaining image data, using an Internet Printing Protocol (IPP) from an external apparatus through a USB communication;
an execution unit configured to execute scan processing, so as to acquire the image data, using the reading device, based on the received HTTP request;
a transmitting unit configured to transmit, to the external apparatus, an HTTP response for responding to the received HTTP request using the IPP, through the USB communication, and
a determination unit configured to determine whether the image data has been acquired,
wherein, in a case where the receiving unit receives the HTTP request from the external apparatus through the USB communication:
without relying on the determination, the transmitting unit transmits to the external apparatus using the IPP through the USB communication, a first HTTP response in response to the received HTTP request, the first HTTP response not including an HTTP response body portion itself,
if the determination unit determines that the image data has not been acquired, the transmitting unit transmits, using the IPP to the external apparatus through the USB communication, a second HTTP response for responding to the received HTTP request, the second HTTP response including an HTTP response body portion in which the image data is not included, and if the determination unit determines that the image data has been acquired, the transmitting unit transmits, using the IPP, to the external apparatus through the USB communication, a third HTTP response for responding to the received HTTP request, the third HTTP response including an HTTP response body portion in which the scanned data is included.

\* \* \* \* \*